(12) United States Patent
Nishiyama et al.

(10) Patent No.: US 11,097,459 B2
(45) Date of Patent: Aug. 24, 2021

(54) BLOW MOLDING APPARATUS

(71) Applicant: NISSEI ASB MACHINE CO., LTD., Nagano (JP)

(72) Inventors: Atsushi Nishiyama, Nagano (JP); Masaki Yamaguchi, Nagano (JP); Haruhito Yumoto, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 82 days.

(21) Appl. No.: 15/771,024

(22) PCT Filed: Oct. 31, 2016

(86) PCT No.: PCT/JP2016/082356
§ 371 (c)(1),
(2) Date: Apr. 25, 2018

(87) PCT Pub. No.: WO2017/073791
PCT Pub. Date: May 4, 2017

(65) Prior Publication Data
US 2018/0311882 A1    Nov. 1, 2018

(30) Foreign Application Priority Data

Oct. 30, 2015    (JP) .............................. JP2015-214941

(51) Int. Cl.
*B29C 49/64* (2006.01)
*B29C 49/06* (2006.01)
(Continued)

(52) U.S. Cl.
CPC .......... *B29C 49/6427* (2013.01); *B29C 49/06* (2013.01); *B29C 49/062* (2013.01);
(Continued)

(58) Field of Classification Search
CPC ............ B29C 49/4205; B29C 49/6427; B29C 49/062
See application file for complete search history.

(56) References Cited

U.S. PATENT DOCUMENTS 4,449,913 A * 5/1984 Krishnakumar ........ B29C 45/00
264/161
6,139,789 A * 10/2000 Neter ...................... B29C 35/16
264/237
(Continued)

FOREIGN PATENT DOCUMENTS

CN    1294546 A    5/2001
CN    1950188 A    4/2007
(Continued)

OTHER PUBLICATIONS

Sato, Yoshinori, English translation of JP2010264710. Nov. 25, 2010 (Year: 2010).*
(Continued)

*Primary Examiner* — Anthony Calandra
*Assistant Examiner* — Eric T Chen
(74) *Attorney, Agent, or Firm* — Greenblum & Bernstein, P.L.C.

(57) ABSTRACT

A blow molding apparatus comprises: a continuous transport section provided with a loop-shaped transport path for continuously transporting a preform; an intermittent transport section for intermittently transporting the preform to a blow molding section; and a delivery section for holding the preform being transported on the transport path, and delivering it to the intermittent transport section. The delivery section is equipped with a cooling means for jetting a cooling fluid from a first nozzle member onto an outer surface of the preform to cool the preform locally.

9 Claims, 7 Drawing Sheets

(51) Int. Cl.
*B29C 49/42* (2006.01)
*B29C 49/70* (2006.01)
*B29L 31/00* (2006.01)
*B29C 49/28* (2006.01)

(52) U.S. Cl.
CPC .......... *B29C 49/4205* (2013.01); *B29C 49/28* (2013.01); *B29C 49/6436* (2013.01); *B29C 49/6472* (2013.01); *B29C 49/70* (2013.01); *B29L 2031/7158* (2013.01)

(56) References Cited

U.S. PATENT DOCUMENTS

| | | | |
|---|---|---|---|
| 6,488,878 B1* | 12/2002 | Neter | B29C 35/16 264/237 |
| 2005/0248054 A1 | 11/2005 | Bates et al. | |
| 2010/0187720 A1 | 7/2010 | Bates et al. | |
| 2013/0236589 A1* | 9/2013 | Yamaguchi | B29C 49/06 425/526 |

FOREIGN PATENT DOCUMENTS

| | | |
|---|---|---|
| CN | 101474864 A | 7/2009 |
| EP | 1 771 292 B1 | 4/2008 |
| EP | 2 886 297 A1 | 6/2015 |
| JP | 10-109356 | 4/1998 |
| JP | 2000-062011 | 2/2000 |
| JP | 2002-292724 | 10/2002 |
| JP | 2010-264710 | 11/2010 |
| JP | 5578397 | 8/2014 |
| WO | WO 9950039 A1 | 10/1999 |
| WO | WO 2012/057016 A1 | 5/2012 |

OTHER PUBLICATIONS

Office Action issued by the Chinese Patent Office dated Jul. 23, 2019, in counterpart Chinese Patent Application No. 201680063262.x.

First Search Report by the Chinese Patent Office dated Jul. 15, 2019, in counterpart Chinese Patent Application No. 201680063262.x.

International Search Report issued by the Japan Patent Office in International Application No. PCT/JP2016/082356, dated Dec. 6, 2016.

Supplementary European Search Report issued in corresponding European Patent Application No. 16 86 0019.5, dated Apr. 15, 2019.

Office Action issued by the China National Intellectual Property Administration in the counterpart Chinese Patent Application No. 201680063262.X dated Apr. 8, 2020.

* cited by examiner (a)

(b)

BLOW MOLDING APPARATUS

TECHNICAL FIELD

This invention relates to a blow molding apparatus for forming a hollow container, which is to be filled with a liquid such as a beverage, by blow molding.

BACKGROUND ART

Blow molding apparatuses have so far been known in which a preform is disposed in a blow cavity mold, and the preform is blow-molded within the blow cavity mold to form a hollow container of a desired shape. Among such blow molding apparatuses one which is equipped with a cooling device (temperature control means) for cooling a preform locally in order to form a hollow container with a partially large wall thickness (see, for example, Patent Document 1).

PRIOR ART DOCUMENTS

Patent Documents

Patent Document 1: Japanese Patent No. 3612395

SUMMARY OF THE INVENTION

Problems to be Solved by the Invention

By exerting local temperature control over the preform by the cooling device (temperature control means), the wall thickness of the hollow container can be increased partly, as described in Patent Document 1. The cooling device described in Patent Document 1, however, is installed between a heating section and a blow molding section of a blow molding machine sharing an intermittently operating transport path. If a time for exerting local temperature control of the preform needs to be lengthened, there is a possibility that a cycle time will be prolonged.

When the preform is cooled locally, for example, it may be necessary to impart a temperature distribution to the site to be locally cooled. A conventional device cannot adapt to such circumstances.

The present invention has been accomplished in the light of the above situations. It is an object of the invention to provide a blow molding apparatus which can adjust the wall thickness of a hollow container partially and appropriately while suppressing the prolongation of the cycle time.

Means for Solving the Problems

An aspect of the present invention, intended to solve the above problems, is a blow molding apparatus including a blow molding section for blow-molding a preform to form a hollow container, comprising: a continuous transport section provided with a loop-shaped transport path for continuously transporting the preform; an intermittent transport section for intermittently transporting the preform to the blow molding section; and a delivery section for holding the preform being transported on the transport path, and delivering the preform to the intermittent transport section, wherein the delivery section is equipped with cooling means for cooling the preform locally by jetting a cooling fluid from a first nozzle member onto an outer surface of the preform.

Preferably, the intermittent transport section is provided above the continuous transport section and apart from the continuous transport section, the delivery section is equipped with an elevating device for raising the preform when the delivery section delivers the preform from the continuous transport section to the intermittent transport section, and the cooling means cools the preform when the preform is being raised by the elevating device.

Preferably, the delivery section is equipped with a reversing device for reversing the direction of the preform when the delivery section delivers the preform from the continuous transport section to the intermittent transport section; the delivery section reverse the direction of the preform, which is being transported by the continuous transport section, by means of the reversing device, and delivers the reversed preform to the intermittent transport section; and the cooling means cools the preform while the reversing device is reversing the preform.

It is preferred for the first nozzle member to be provided so as to be movable along the vertical direction of the preform during cooling of the preform.

Preferably, the cooling means is equipped with a second nozzle member which is inserted into the preform to jet the cooling fluid onto an inner surface of the preform, and the second nozzle member is provided to be movable along the vertical direction of the preform together with the first nozzle member.

Preferably, the cooling means jets the cooling fluid along a row of the preforms from the first nozzle member, and is equipped with a shielding plate, which is provided between the first nozzle members, for blocking the cooling fluid jetted from each of the first nozzle members and passed along the preform.

Effects of the Invention

According to the blow molding apparatus of the present invention described above, it is possible to adjust the wall thickness of the hollow container partially and appropriately while suppressing the prolongation of the cycle time.

MODE FOR CARRYING OUT THE INVENTION

Embodiments of the present invention will now be described in detail by reference to the accompanying drawings.

Embodiment 1

First of all, the overall configuration of a blow molding apparatus according to the present embodiment will be described by reference to FIG. 1.

Figure 1:
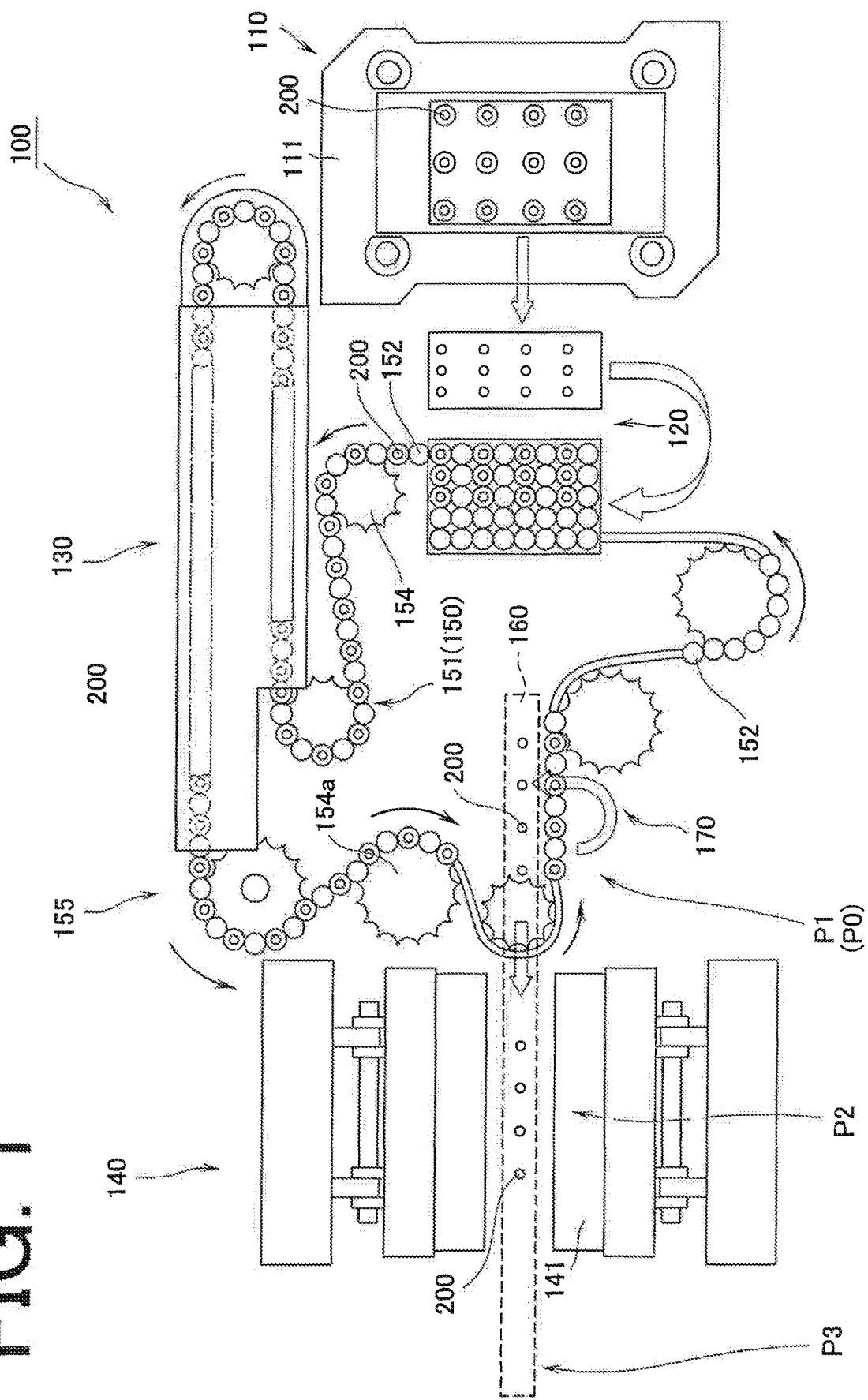
FIG. 1 is a plan view showing the overall configuration of a blow molding apparatus according to Embodiment 1 of the present invention.

As shown in FIG. 1, a blow molding apparatus 100 comprises an injection molding section 110 for injection molding a preform 200 to be formed into a hollow container, a cooling section 120 for cooling the preform 200 molded by the injection molding section 110, a heating section 130 for heating the preform 200, and a blow molding section 140 for blow molding the preform 200 placed in a blow cavity mold.

The blow molding apparatus 100 is also equipped with a continuous transport section 150 for transporting the preform 200 molded by the injection molding section 110 to the blow molding section 140. The continuous transport section 150 has a loop-shaped transport line 151, and continuously transports the preform 200 along the loop-shaped transport line 151 by means of a transport jig 152. That is, the continuous transport section 150 is configured to be capable of transporting the transport jig 152 repeatedly along the loop-shaped transport line 151.

Moreover, the blow molding apparatus 100 has, on a side downstream of the heating section 130 on the transport line 151, an intermittent transport section 160 for holding a plurality of (e.g., four) the preforms 200 and transporting them intermittently to the blow molding section 140, and a delivery section 170 for delivering (transferring) the preforms 200 continuously transported by the continuous transport section 150 from the transport line 151 to the intermittent transport section 160.

The configurations of the injection molding section 110, cooling section 120, heating section 130, and blow molding section 140 constituting the blow molding apparatus 100 according to the present embodiment, and the configurations of the continuous transport section 150, intermittent transport section 160, and delivery section 170 for transporting the preform 200 are publicly known. Hence, explanations for them will be offered briefly here (if necessary, reference is requested to WO2012/057016 belonging to the present applicant).

The injection molding section 110 is equipped with a mold clamping mechanism 111, and has the mold clamping mechanism 111 clamp a core mold disposed above and a cavity mold disposed below, although these molds are not shown. In the injection molding section 110, a resin material (starting material) is filled by an injection device into an injection space defined by the core mold and the cavity mold, whereby the preform 200 is injection-molded. In the injection molding section 110, the highest number of the order of 12 (3 rows by 4/row) of the preforms 200, for example, can be molded at the same time.

The cooling section 120 forcibly cools the injection-molded preforms 200. The preforms 200 injection-molded in the injection molding section 110 are continuously transported along the loop-shaped transport line 151 by the continuous transport section 150. During this process, they are first supplied from the injection molding section 110 to the cooling section 120. The preforms 200 are forced into cooling by the cooling section 120. When cooled to a predetermined temperature, they are carried out of the cooling section 120 and continuously transported along the transport line 151.

The preform 200 is molded in an upright state, with its neck section facing upward, in the injection molding section 110 and, in this state, is transported from the injection molding section 110 to the cooling section 120. In the cooling section 120, there is a reversal mechanism (not shown) for reversing the preform 200, transported in such an upright state, into an inverted state with its neck section facing downward. The preform 200, while being cooled in the cooling section 120, is reversed into an inverted state by the reversal mechanism, and is held by the transport jig (transport member) 152 provided in the continuous transport section 150.

The loop-shaped transport line 151 is configured such that a plurality of the transport jigs 152 are transported continuously one after another by the driving force of sprockets 154, etc. The transport jigs 152 are arranged, for example, in a plurality of rows below the cooling section 120 and, when holding the preforms 200, they are carried out onto the transport line 151. Then, the transport jigs 152 are transported along the transport line 151 while holding the preforms 200, and carried into the heating section 130.

In the heating section 130, the preform 200 cooled in the cooling section 120 is heated to a temperature suitable for stretching, while being moved along the transport line 151. In the present embodiment, the preform 200 is heated while being allowed to rotate on its axis within the heating section 130, whereby the entire preform 200 is uniformly heated. The preform 200 heated by the heating section 130 is transported along the transport line 151 to the delivery section 170, where it is passed on (transferred) to the intermittent transport section 160.

In the present embodiment, the plurality of (e.g., eight) transport jigs 152 consecutive in the transport direction are coupled by a connecting member (not shown). The continuous transport section 150 repeats the driving and stopping of the sprockets 154 (154a), on the transport line 151 on the side downstream of a curved transport section 155 curving with a predetermined radius, thereby supplying a plurality of (e.g., four of) the preforms 200 at a time to delivery section 170.

The delivery section 170 is equipped with a reversing device (not shown), and causes the reversing device to reverse the preform 200 into an upright state. The preform 200 has been disposed at a delivery position P0 directly below the reversing device, and transported in the inverted state, with its neck section facing downward, along the transport line 151. Moreover, the delivery section 170 is equipped with, for example, an elevating device (not shown) for raising and lowering the reversing device, and delivers the upright preform 200, in a state raised to a predetermined position, to the intermittent transport section 160.

In other words, the delivery section 170 executes a first delivery step of receiving the inverted preform 200 being transported along the transport line 151, and reversing it into an upright state by the action of the reversing device; and a second delivery step of delivering (transferring) the upright preform 200 from the reversing device to the intermittent transport section 160 in accordance with an ascending motion of the reversing device.

The intermittent transport section 160 grasps the neck section of each upright preform 200 by the action of a blow transporting chuck member, which is provided in the intermittent transport section 160 so as to be openable and closable, although this is not shown. The intermittent transport section 160 (blow transporting chuck member) is slid (moved) from a delivery position P1 above the delivery position P0 to a blow molding position P2, whereby a plurality of the preforms 200 are carried at predetermined intervals into a blow cavity mold 141.

In the blow molding section 140, a predetermined number of the preforms 200 received from the delivery section 170 are carried to the blow cavity mold 141 composed of a pair of split molds. The preforms 200 are blow-molded in the blow cavity mold 141 to form hollow containers (not shown).

The hollow containers so molded in the blow molding section 140 (blow cavity mold 141) are transported by the intermittent transport section 160 to a withdrawal position P3 outside the blow molding section 140.

Incidentally, the blow molding apparatus 100 according to the present invention has a non-contact cooling device (cooling means) 300 provided in the delivery section 170 which, as described above, delivers the preform 200 from the transport line 151 to the intermittent transport section 160, the cooling device 300 being adapted to cool the preform 200 locally.

Figure 2:
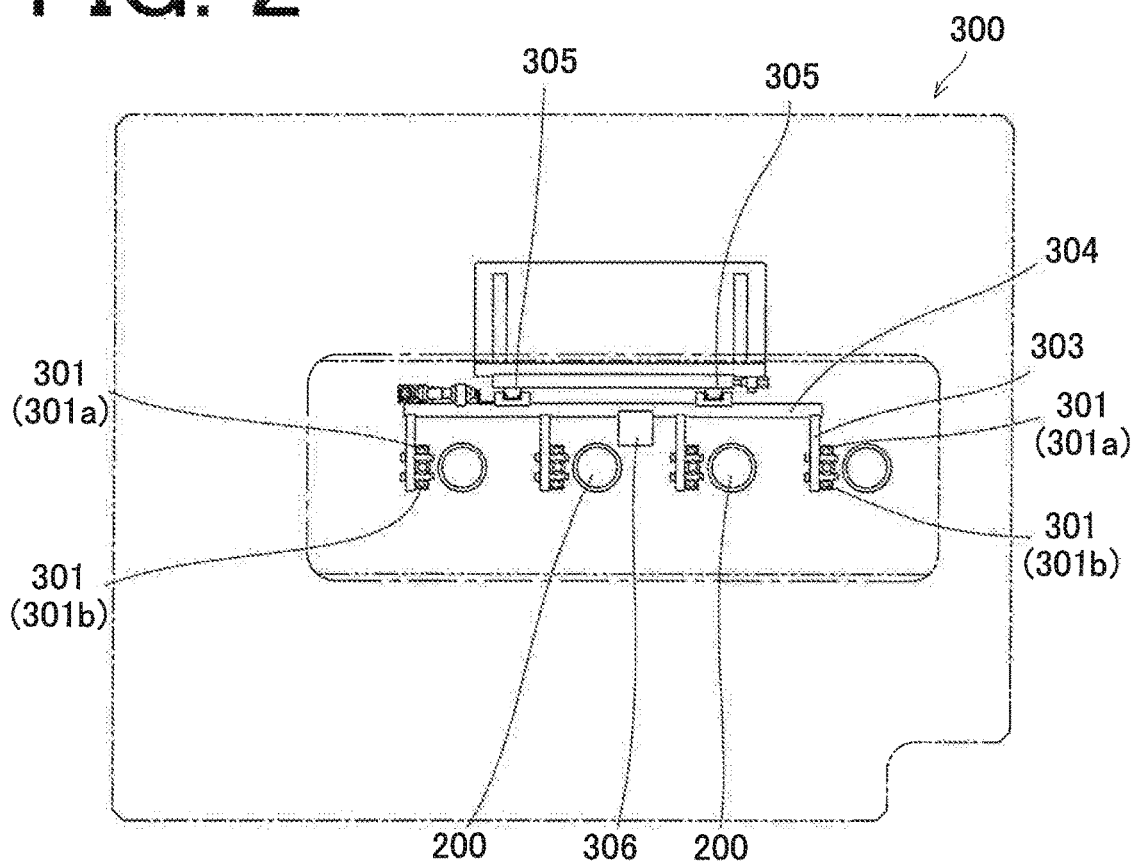
FIG. 2 is a top view showing an example of a cooling device according to Embodiment 1 of the present invention.
Figure 3:
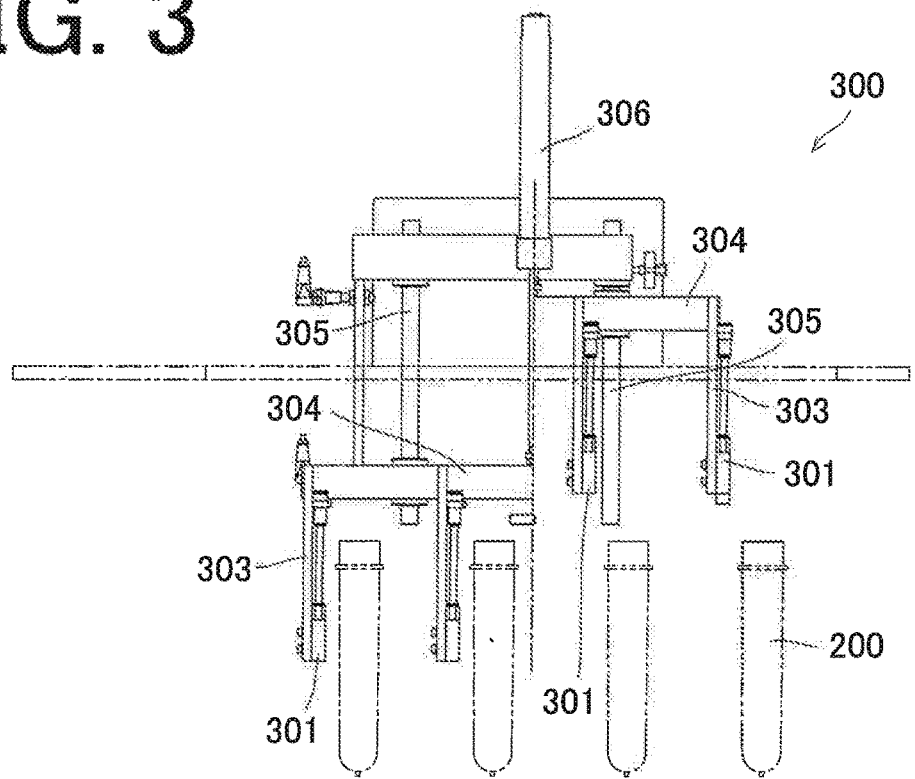
FIG. 3 is a front view showing the example of the cooling device according to Embodiment 1 of the present invention.
Figure 4:
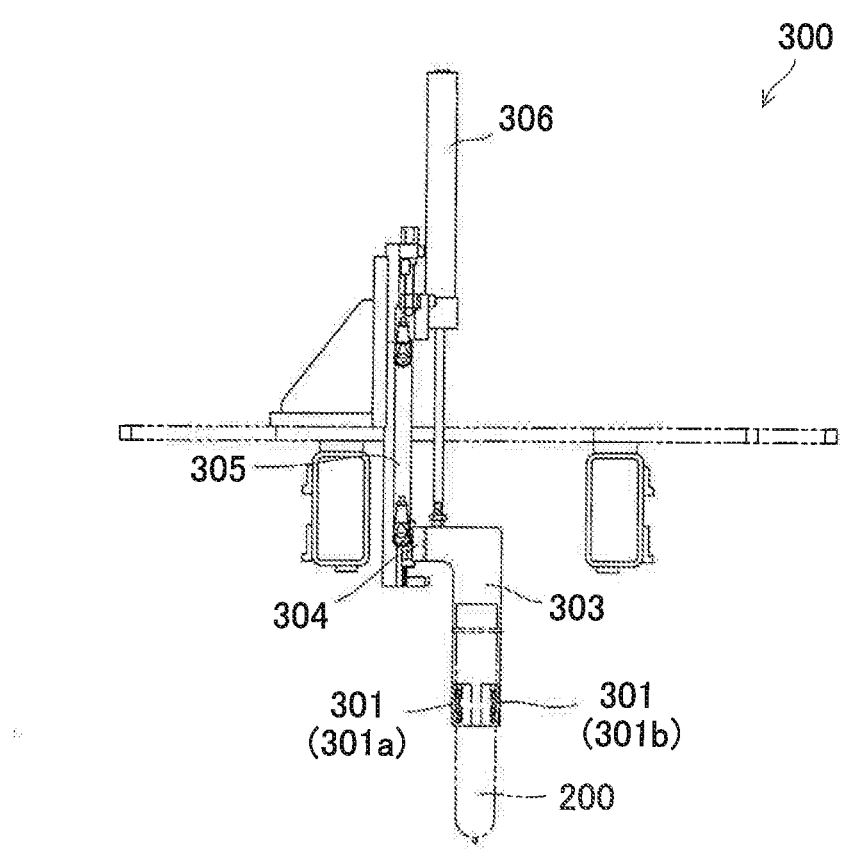
FIG. 4 is a side view showing the example of the cooling device according to Embodiment 1 of the present invention.

Referring to FIGS. 2 to 4, the cooling device 300 will be described below. FIG. 2 is a top view showing the configuration of a nozzle portion of the cooling device, and FIG. 3 is a front view of FIG. 2. The left side of FIG. 3 shows a state where a mounting plate has descended (a state in which the cooling device is located at a position of execution of local cooling (local cooling position)), while the right side of FIG. 3 shows a state where the mounting plate has ascended (a state in which the cooling device is located at a waiting position). FIG. 4 is a left side view of FIG. 3. Cooling by the cooling device 300 is performed for the preforms 200 in the second delivery step.

As shown in FIGS. 2 to 4, the cooling device 300 has a first nozzle member 301 formed with a nozzle for jetting a cooling fluid, such as cooling air, onto an outer surface of each preform 200. The cooling device 300 locally cools a predetermined position of the preform 200 with cooling air jetted from the first nozzle member 301 before the preform 200 is carried into the blow molding section 140.

In the present embodiment, the first nozzle member 301 is held at the waiting position during transport of the preform 200 along the transport line 151. When the preform 200 is reversed in the delivery section 170 into an upright state, the first nozzle member 301 lowers to the local cooling position.

The predetermined position of the preform 200 to be cooled with the cooling fluid jetted from the first nozzle member 301 refers to the wall surface position of the preform 200 corresponding to the wall surface of the resulting hollow container which is to be partly increased in wall thickness. Examples of the wall surface of the hollow container which should be increased in wall thickness include a site whose buckling strength should be increased, a grip region and, when a separate handle is to be mounted, the site where the handle is assembled.

FIGS. 2 to 4 show the state in which the preform 200 has been reversed (upright state) by the reversing device (not shown) of the delivery section 170. The first nozzle member 301 is provided independently of the reversing device, and is configured to be disposable at a position close to each preform 200 placed in the upright state. In the present embodiment, two of the first nozzle members 301 (301*a*, 301*b*) are provided in correspondence with each preform 200. When the respective first nozzle members 301 are lowered to the local cooling position, they are disposed at the positions close to the preforms 200 in the row direction of the preforms 200 arranged in a row at the delivery position. In this state, the first nozzle members 301 jet cooling air in a direction nearly along the row of the preforms 200.

The respective first nozzle members 301 may be arranged at positions close to the preform 200 in a direction perpendicular to the row direction of the preforms 200. Moreover, the first nozzle members 301 may be lowered beforehand from the waiting position to the local cooling position before the preforms 200 are transported along the transport line 151 and brought to the delivery position P0 or the delivery position P1. If there is a possibility that the preform 200 locally cooled and transported to the blow cavity mold 141 will interfere with the first nozzle members 301, the first nozzle members 301 may be raised beforehand to the waiting position.

These first nozzle members 301 are provided to be movable along the vertical direction of the preform 200 when they are arranged at the positions close to the preform 200. In the present embodiment, the respective first nozzle members 301 are mounted on a mounting plate 303, and the mounting plates 303 are fixed to a connecting plate 304 outside the row of the preforms 200. The connecting plate 304 is mounted slidably on guide members 305 extending in the vertical direction, and is ascendable and descendable by the action of an air cylinder 306.

Since the first nozzle members 301 are configured to be ascendable and descendable as mentioned above, a predetermined site of the preform 200 can be locally cooled by the cooling device 300, with the preform 200 being moved. In the present embodiment, for example, the cooling device 300 (first nozzle member 301) can be raised or lowered in synchronization with the ascent or descent of the preform 200 in the delivery section 170. Even during the ascent of the preform 200, therefore, the cooling device 300 (first nozzle member 301) can be raised synchronously, whereby the predetermined site of the preform 200 can be locally cooled. Thus, prolongation of the cycle time in accordance with the cooling of the preform 200 by the cooling device 300 can be suppressed.

In the present embodiment, as mentioned above, the cooling device 300 is provided in the delivery section 170 which delivers to the intermittent transport section 160 the preform 200 being continuously transported by the continuous transport section 150. Because of this configuration, the local cooling of the preform 200 can be performed by taking advantage of the time required to deliver the preform 200 to the intermittent transport section 160. Thus, the prolongation of the cycle time in accordance with the cooling of the preform 200 by the cooling device 300 can be suppressed more reliably.

Furthermore, local cooling of the predetermined site by the cooling device 300 may be performed, for example, with the preform 200 being stopped. For example, it is permissible to perform local cooling of the preform 200 whose delivery (transfer) from the reversing device to the intermittent transport section 160 has been completed, and which has been held by the blow transporting chuck member (not shown) of the intermittent transport section 160 and has been placed in a stationary state. That is, local cooling of the preform 200 in the stationary state is carried out before the preform 200 is slid (moved) from the delivery position P1 to the blow molding position P2. By cooling the preform 200 brought to a halt, while raising or lowering (moving upward or downward) the first nozzle members 301, as appropriate, a temperature distribution can be imparted to the range of cooling.

According to the blow molding apparatus 100 of the present embodiment provided with the above-described cooling device 300, the wall thickness of the hollow container can be adjusted partially and appropriately, with prolongation of the cycle time being suppressed.

The cooling device 300 according to the present invention has been described above, but the configuration of the cooling device 300 is not limited to that in the above embodiment.

Figure 5:
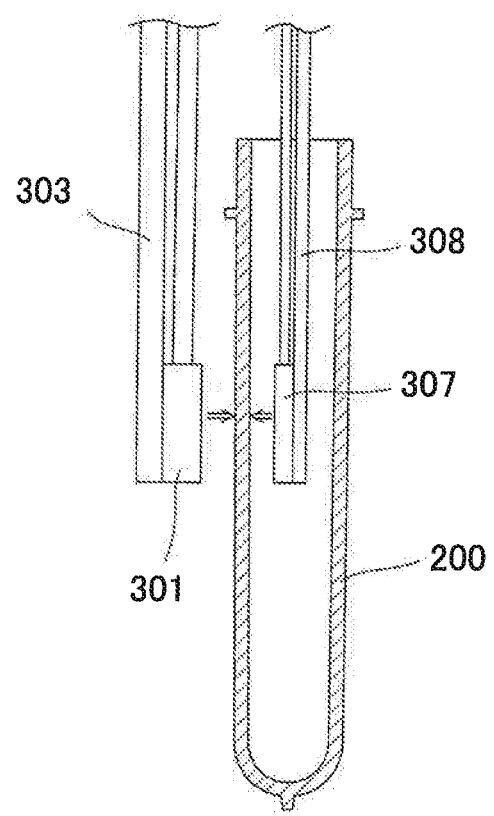
FIG. 5 is a schematic view showing a modification of the cooling device according to Embodiment 1 of the present invention.

The above embodiment illustrates the configuration in which the cooling device 300 is equipped with the first nozzle members 301 formed with nozzles for jetting cooling air onto the outer surface of the preform 200. As shown in FIG. 5, however, the cooling device 300 may further have a second nozzle member 307 formed with a nozzle for jetting cooling air onto the inner surface of the preform 200. The second nozzle member 307 is disposed to oppose the first nozzle member 301, with the preform 200 being interposed therebetween, so as to cool the predetermined site of the preform 200 locally. In this example. the second nozzle member 307 is mounted, for example, on a leading end part of a support plate 308, which has been fixed to the connecting plate 304 (see FIG. 2), so as to oppose the first nozzle member 301, and is adapted to be ascendable and descendable together with the first nozzle member 301. Arrows in FIG. 5 show the directions of jets of cooling air.

As mentioned above, the cooling device 300 is configured to have the second nozzle member 307 along with the first nozzle member 301, whereby it becomes possible to cool the inner wall surface and outer wall surface of the preform 200 simultaneously. Thus, the predetermined site of the preform 200 can be cooled to a desired temperature in a shorter time. By cooling the preform 200 from inside and outside, moreover, a more suitable position conformed to the type or the like of a hollow container to be produced can be cooled.

Figure 6:
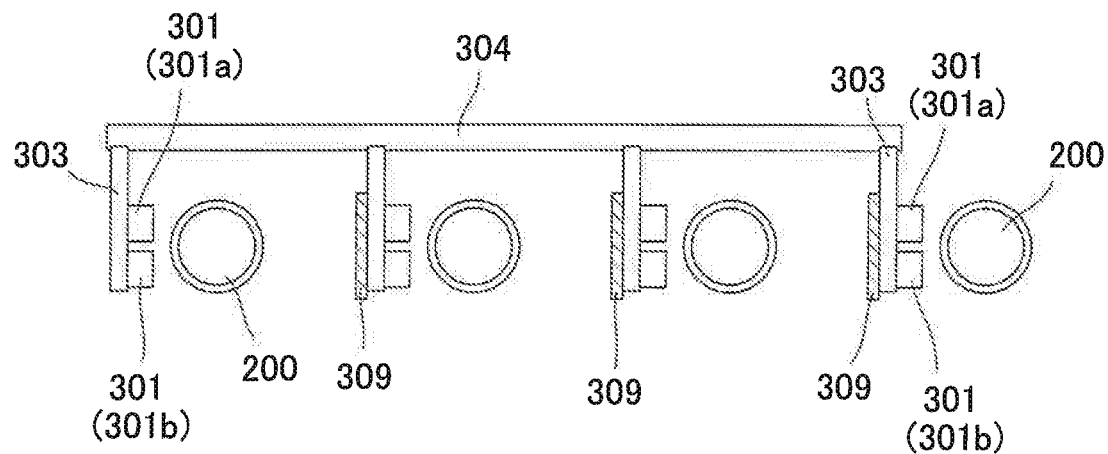
FIGS. 6(a), 6(b) are schematic views showing another modification of the cooling device according to Embodiment 1 of the present invention.
Figure 6:
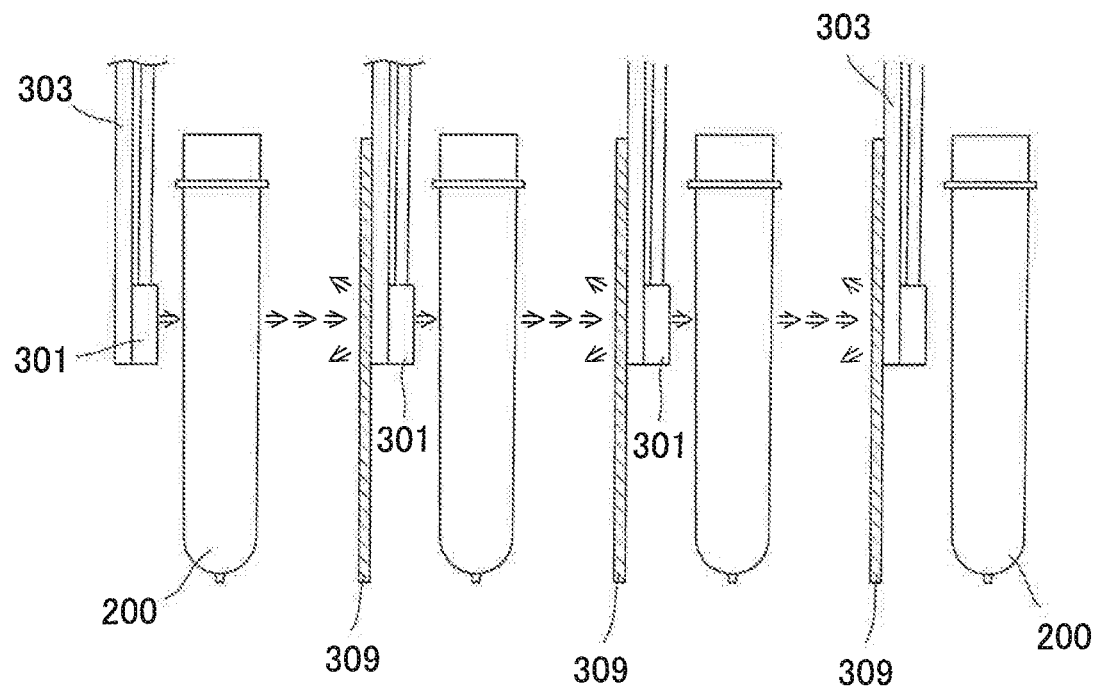

Alternatively, the cooling device 300 may have a shielding plate 309 which is disposed between the first nozzle members 301 and blocks a cooling fluid jetted from the first nozzle members 301 and passed along the preform 200, for example, as shown in FIGS. 6(a), 6(b). In this example, the shielding plate 309 is fixed to a surface of each mounting plate 303 on the side opposite to the first nozzle members 301. Of course, the shielding plate 309 may be provided independently of the first nozzle members 301.

By providing such a shielding plate 309, each preform 200 is cooled only with cooling air jetted from the first nozzle members 301 provided in correspondence with the individual preform. That is, the influence of cooling air jetted from the first nozzle members 301 other than those provided in correspondence with the individual preform 200 can be curtailed. Thus, each preform 200 can be cooled more appropriately.

Embodiment 2

Figure 7:
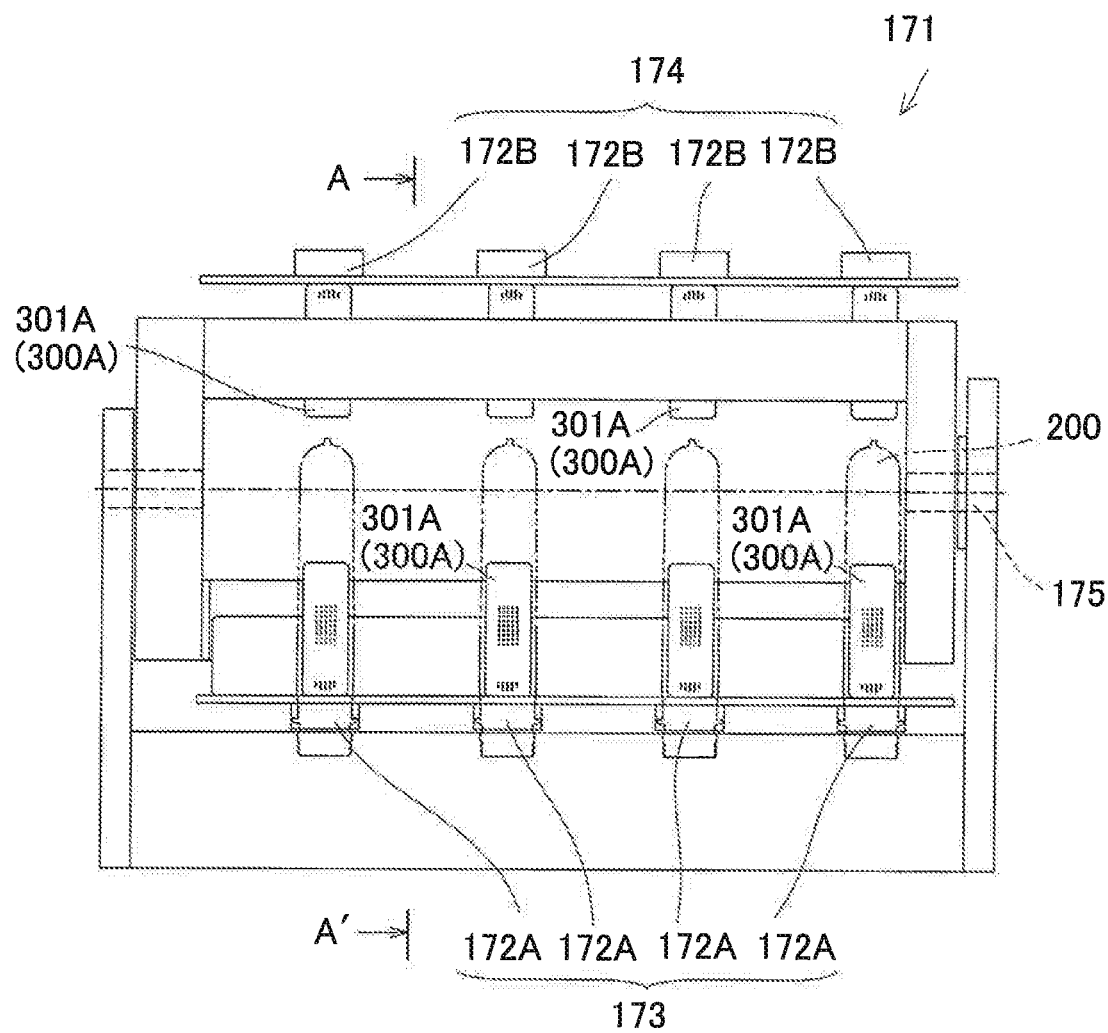
FIG. 7 is a front view showing an example of a reversing device including a cooling device according to Embodiment 2 of the present invention.
Figure 8:
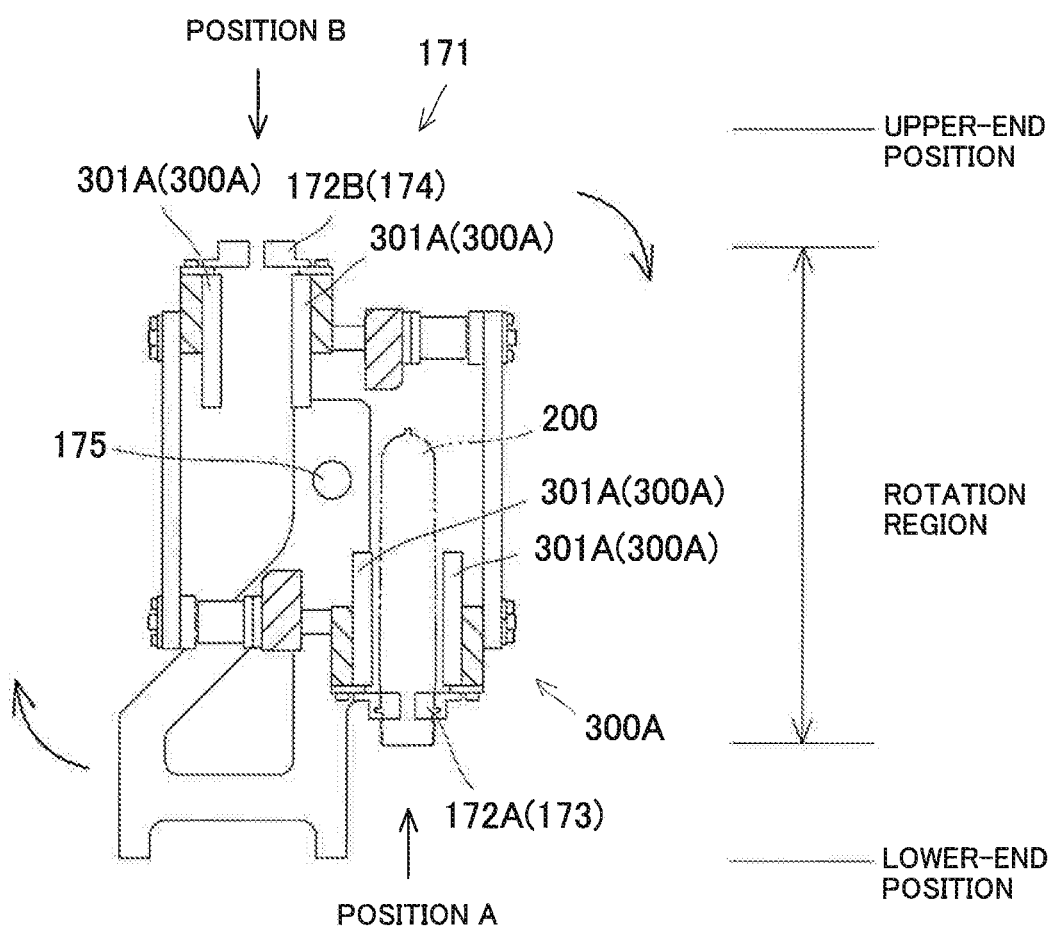
FIG. 8 is a sectional view showing the example of the reversing device including the cooling device according to Embodiment 2 of the present invention.

FIGS. 7 and 8 are views illustrating a cooling device (cooling means) according to Embodiment 2 of the present invention. FIG. 7 is a front view showing an example of a reversing device provided with a cooling device. FIG. 8 is a sectional view taken on line A-A' in FIG. 7.

The present embodiment is an example in which a cooling device for cooling each preform 200 by jetting a cooling fluid onto its outer surface is provided in a reversing device for reversing the preform 200 present in the delivery section 170, and cooling of the preform can be performed during reversal of the preform by the reversing device. That is, cooling by the cooling device is carried out for the preform 200 in the first delivery step, or for the preform 200 during transfer from the first delivery step to the second delivery step.

In detail, as shown in FIGS. 7 and 8, the delivery section 170 is equipped with a reversing device 171, and the reversing device 171 has a first chuck pair 173 including a plurality of (e.g., four) chuck members 172A for grasping the preforms 200, and a second chuck pair 174 including a plurality of (e.g., four) chuck members 172B. The first chuck pair 173 is connected to an air cylinder or the like (not shown), and the respective chuck members 172A are opened or closed simultaneously. Likewise, the second chuck pair 174 is connected to an air cylinder or the like, and the respective chuck members 172B are opened or closed simultaneously.

The reversing device 171 is configured such that the first chuck pair 173 and the second chuck pair 174 are rotated about a rotating shaft 175 as a center of rotation (see FIG. 8). The first chuck pair 173 and the second chuck pair 174 are arranged at such positions as to be in point symmetry with respect to the rotating shaft 175 as the center in FIG. 8. That is, the first chuck pair 173 and the second chuck pair 174 are arranged such that when they are rotated 180 degrees about the rotating shaft 175, the position of the first chuck pair 173 (position A in FIG. 8) and the position of the second chuck pair 174 (position B in FIG. 8) are interchanged.

Furthermore, the delivery section 170 is composed of, for example, ball screws to be driven by a servomotor, and nut parts to be screwed to the ball, and is equipped with an elevating device for raising or lowering the reversing device 171, although this is not shown. In other words, the reversing device 171 is configured to be ascendable and descendable by the action of the elevating device, with the preforms 200 being grasped with the first chuck pair 173 or the second chuck pair 174.

In the present embodiment, first nozzle members 301A, which a cooling device 300A has, are provided in each chuck member 172A constituting the first chuck pair 173, and in each chuck member 172B constituting the second chuck pair 174. Thus, the first nozzle members 301A provided in the cooling device 300A move in accordance with the movement of the first chuck pair 173 and the second chuck pair 174 by the reversing device 171 (or the elevating device). In short, the first nozzle members 301A move together with the preform 200, as the preform 200 moves.

The first nozzle members 301A, in the present embodiment, are provided on both sides of each of the preforms 200 grasped by the first chuck pair 173 and the second chuck pair 174, but their arrangement is not particularly limited. The first nozzle members 301A may be provided, for example, only on one side of the preforms 200 grasped by the first chuck pair 173 and the second chuck pair 174, in accordance with the cooling position of the preforms 200. Furthermore, the first nozzle members 301A may be arranged at positions perpendicular to the row direction of the preforms 200 (in FIG. 8, left-hand and right-hand positions on the sheet face interposing the preform 200 therebetween), as shown in FIGS. 7 and 8. Alternatively, the first nozzle members 301A may be arranged at positions along the row direction of the preforms 200 (in FIG. 8, positions on the front side and the back side of the sheet face interposing the preform 200 therebetween), as explained in Embodiment 1.

Because of the foregoing features, local cooling of the preform 200 can be performed before the reversal of the preform 200 in the delivery section 170 is completed.

In detail, when the preform 200 is to be delivered in the delivery section 170 to the intermittent transport section 160, the reversing device 171 is first lowered to a lower-end position (delivery position P0) by the elevating device (not shown).

If, at this time, the first chuck pair 173 of the reversing device 171 is located at the position A (see FIG. 8), the chuck members 172A of the first chuck pair 173 are set in an open state, when the reversing device 171 is lowered to the lower-end position. When the reversing device 171 reaches the lower-end position, the chuck members 172A are brought into a closed state, and the preforms 200 transported to the delivery section 170 by the transport jigs 152 are grasped by the first chuck pair 173. As a result, the preforms 200 in the inverted state are delivered from the continuous transport section 150 to the delivery section 170 (first delivery step).

Then, the reversing device 171 is raised by the elevating device. The reversing device 171 makes a 180-degree rotation in a rotation region to bring the preform 200 grasped in the inverted state into an upright state. That is, in the rotation range, the first chuck pair 173 is rotated from the position A to the position B, whereby the preform 200 enters the upright state. On this occasion, the cooling fluid is jetted toward each preform 200 from the first nozzle members 301A provided in each chuck member 172A to cool the preform 200 locally. The rotation region refers to a range where the reversing device 171 can rotate without interfering with surrounding members. The rotation region may be set as appropriate, but is preferably set as broadly as possible. By so doing, the cooling time of the preform 200 can be ensured sufficiently in the rotation region.

After the preform 200 is brought into the upright state, the reversing device 171 is raised to an upper-end position (delivery position P1). At this upper-end position, the neck section of each preform 200 is grasped by a chuck provided in the intermittent transport section 160, and the chuck members 172A of the first chuck pair 173 are entered into an open state. By this procedure, the preform 200 in the upright state is transferred from the delivery section 170 to the intermittent transport section 160 (second delivery step). That is, in the delivery section 170, the preform 200 is delivered from the continuous transport section 150 to the intermittent transport section 160. Then, the reversing device 171 is lowered to the waiting position, whereupon a series of actions is completed.

In the present embodiment, local cooling of the preform 200 is carried out during rotation of the reversing device 171, but may be performed by the time when the reversing device 171 arrives at the upper-end position. The local cooling of the preform 200 can be performed during the ascent of the reversing device 171 into the rotation region, or can be performed during its ascent from the rotation region to the upper-end position. Furthermore, the local cooling of the preform 200 can be performed when the reversing device 171 is at a temporary standstill in the rotation region.

When, as mentioned above, the reversing device 171 is lowered from the upper-end position to the waiting position, in this state, the first chuck pair 173 is located at the position B, whereas the second chuck pair 174 is located at the position A, in contrast to the example of FIG. 8. Thus, when the preform 200 is then delivered in the delivery section 170 to the intermittent transport section 160, the preform 200 is held by the second chuck pair 174 instead of the first chuck pair 173, and passed on to the intermittent transport section 160.

On this occasion as well, it goes without saying that when the reversing device 171 is rotated at the waiting position to reverse the preform 200, the cooling fluid is jetted toward the preform 200 from the first nozzle members 301A provided in each chuck member 172B, whereby the preform 200 is locally cooled.

By so doing, local cooling of the preform 200 can be performed by making further effective use of the time required for delivering the preform 200 in the delivery section 170 from the continuous transport section 150 to the intermittent transport section 160. Hence, the prolongation of the cycle time in accordance with the cooling of the preform 200 by the cooling device 300 can be suppressed more reliably.

The embodiments of the present invention have been described above, but it is to be understood that the invention is in no way limited to these embodiments. The present invention can be changed or modified, as appropriate, without departing from its spirit and scope.

EXPLANATIONS OF LETTERS OR NUMERALS

100 Blow molding apparatus
110 Injection molding section
111 Mold clamping mechanism
120 Cooling section
130 Heating section
140 Blow molding section
141 Blow cavity mold
150 Continuous transport section
151 Transport line
152 Transport jig
154 Sprocket
160 Intermittent transport section
170 Delivery section
172A, 172B Chuck member
173 First chuck pair
174 Second chuck pair
175 Rotating shaft
200 Preform
300, 300A Cooling device
301, 301A First nozzle member
303 Mounting plate
304 Connecting plate
305 Guide member
306 Air cylinder
307 Second nozzle member
308 Support plate
309 Shielding plate

The invention claimed is:

1. A blow molding apparatus including a blow molding section for blow-molding a preform to form a hollow container, comprising:
   a continuous transport section provided with a loop-shaped transport path for continuously transporting the preform;
   an intermittent transport section for intermittently transporting the preform to the blow molding section, the intermittent transport section being provided above the continuous transport section and apart from the continuous transport section; and
   a delivery section for holding a plurality of preforms being transported on the loop-shaped transport path, and delivering the preforms to the intermittent transport section, the delivery section raising the preforms when the delivery section delivers the preforms from the continuous transport section to the intermittent transport section, wherein the delivery section is equipped with a cooling device having a plurality of first nozzle members, the respective first nozzle members cooling the respective preforms locally by jetting a cooling fluid from the respective first nozzle members onto an outer surface of the respective preforms such that a single first nozzle member cools a single preform, and in the delivery section, while the preforms and the first nozzle members are being raised by the delivery section in synchronization with each other in the same direction, the respective first nozzle members cool the respective preforms such that a predetermined site of each preform is maintained cooled.

2. The blow molding apparatus according to claim 1, wherein the delivery section reverses the direction of the preforms transported by the continuous transport section, and delivers the reversed preforms to the intermittent transport section, and the cooling device cools the preforms while the preforms are being reversed.

3. The blow molding apparatus according claim 1, wherein the first nozzle members are provided so as to be movable along a vertical direction of the preforms during cooling of the preforms.

4. The blow molding apparatus according to claim 1, wherein the cooling device is equipped with a plurality of second nozzle members which are respectively inserted into the preforms, the respective second nozzle members jetting the cooling fluid onto an inner surface of the respective preforms, and the second nozzle members are provided to be movable along a vertical direction of the preforms together with the first nozzle members.

5. The blow molding apparatus according to claim 1, wherein the cooling device jets the cooling fluid along a row of the preforms from the first nozzle members, and the cooling device is equipped with a shielding plate, which is provided between the first nozzle members, for blocking the cooling fluid jetted from each of the first nozzle members and passed along the preform.

6. The blow molding apparatus according to claim 1, wherein the first nozzle members of the cooling device are configured to be raised and lowered in synchronization with an ascent and descent of the preform in the delivery section.

7. The blow molding apparatus according to claim 1, wherein the cooling device is equipped with a plurality of second nozzles members which are respectively inserted into the preforms, the respective second nozzle members jetting the cooling fluid onto an inner surface of the respective preforms, and the respective first nozzle members face the respective second nozzle members in a radial direction of the preforms.

8. The blow molding apparatus according to claim 5, wherein the shielding plate is disposed between adjacent first nozzle members.

9. The blow molding apparatus according to claim 5, wherein the shielding plate is provided to be movable along a vertical direction of the preforms together with the first nozzle members.

* * * * *